US012160073B1

(12) United States Patent
Wrigley et al.

(10) Patent No.: US 12,160,073 B1
(45) Date of Patent: Dec. 3, 2024

(54) SYMMETRIC RADIO FREQUENCY COAXIAL SPLITTERS

(71) Applicant: Lockheed Martin Corporation, Bethesda, MD (US)

(72) Inventors: Jason Stewart Wrigley, Littleton, CO (US); Erik Lier, Lakewood, CO (US); James F. Mulvey, Littleton, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 359 days.

(21) Appl. No.: 17/839,561

(22) Filed: Jun. 14, 2022

(51) Int. Cl.
*H01R 9/05* (2006.01)
*H01R 13/6597* (2011.01)
*H01R 31/02* (2006.01)
*H01R 103/00* (2006.01)

(52) U.S. Cl.
CPC ......... *H01R 31/02* (2013.01); *H01R 13/6597* (2013.01); *H01R 2103/00* (2013.01)

(58) Field of Classification Search
CPC . H01R 13/6597; H01R 31/02; H01R 2103/00
USPC .......................................................... 439/578
See application file for complete search history.

(56) References Cited

U.S. PATENT DOCUMENTS 3,091,743 A * 5/1963 Wilkinson ................ H01P 5/16 333/127
3,440,329 A * 4/1969 Winston ................. H05K 5/061 174/541
3,641,464 A * 2/1972 Crowhurst .............. H01F 19/08 333/32
3,951,490 A * 4/1976 Devendorf ........... H01R 9/0506 174/59
4,141,615 A * 2/1979 Takeuchi ................. H05K 5/04 439/578
4,226,495 A * 10/1980 Palle .................... H01R 9/0506 439/535
4,648,682 A * 3/1987 Tubbs .................. H01R 24/542 D13/133
4,720,677 A * 1/1988 Donecker .............. G01R 27/06 324/648
4,740,172 A * 4/1988 Tubbs .................. H01R 24/542 439/344
5,021,755 A * 6/1991 Gustafson ................. H01P 5/16 333/136
5,058,198 A * 10/1991 Rocci ..................... H03H 7/482 333/132
5,142,253 A * 8/1992 Mallavarpu ............... H01P 5/12 333/127

(Continued)

*Primary Examiner* — Abdullah A Riyami
*Assistant Examiner* — Vladimir Imas

(57) ABSTRACT

Provided herein are various enhanced assemblies and techniques for forming high-power radio frequency coaxial splitters. In one example, an apparatus includes an input coaxial port having a center conductor coupled to a first longitudinal end of a generally cylindrical conductor member formed along a longitudinal axis within a housing forming a cavity about the conductor member. Output coaxial ports are included having center conductors coupled to generally square output branches arrayed at a second longitudinal end about the conductor member in a plane perpendicular to the longitudinal axis. A thermal shunt is included comprising a thermal connection between the housing and a recess formed into the conductor member along the longitudinal axis at the second longitudinal end.

20 Claims, 6 Drawing Sheets

(56) References Cited

U.S. PATENT DOCUMENTS 5,677,578 A * 10/1997 Tang .................... H01R 13/701 307/119
5,735,711 A * 4/1998 Fremgen .............. H01R 9/0506 174/59
5,818,385 A * 10/1998 Bartholomew ........ H01Q 3/005 342/372
5,903,829 A * 5/1999 Anderson .............. H01R 24/52 361/752
6,208,903 B1 * 3/2001 Richards ............ A61B 18/1815 607/101
6,437,580 B1 * 8/2002 Gale ...................... G01R 31/58 324/555
6,486,747 B1 * 11/2002 DeCramer ............... H03H 7/42 333/32
6,498,582 B1 * 12/2002 Sweeney ................. G01S 13/44 342/149
6,786,757 B2 * 9/2004 Pocrass ................ H01R 9/0524 439/418
6,790,049 B2 * 9/2004 Kaylie ................. H05K 9/0056 333/100
7,635,270 B2 * 12/2009 Walter ............... H01R 13/6473 361/752
7,830,225 B2 * 11/2010 Gale .................... H01R 24/547 333/136
8,170,643 B2 * 5/2012 Turner ..................... A61N 5/02 607/101
8,458,759 B2 * 6/2013 Zinevich ................ H04N 17/00 725/124
8,508,313 B1 * 8/2013 Aster ........................ H01P 5/12 333/127
8,920,193 B2 * 12/2014 Riggsby ............... H01R 13/502 439/578
9,065,163 B1 * 6/2015 Wu ......................... H03F 3/211
9,407,050 B2 * 8/2016 Holland ................. H01R 24/40
9,590,287 B2 * 3/2017 Burris ........................ H01T 4/10
9,673,503 B1 * 6/2017 Aster ...................... H01P 1/202
9,793,660 B2 * 10/2017 Holland ................. H01R 24/46
10,276,906 B1 * 4/2019 Aster ......................... H01P 3/06
10,705,199 B2 * 7/2020 Peckham ............. G08G 5/0004
11,002,234 B2 * 5/2021 Pitcel ................... F02M 57/027
11,539,176 B2 * 12/2022 Henningsen ......... H01R 31/005
11,862,913 B2 * 1/2024 Wild .................... H01R 25/006
2010/0095344 A1 * 4/2010 Newby ............. H04N 21/6168 725/125
2011/0028035 A1 * 2/2011 McAllister ........... H01R 13/748 439/579

* cited by examiner

SYMMETRIC RADIO FREQUENCY COAXIAL SPLITTERS

TECHNICAL BACKGROUND

Splitters and dividers are commonly employed to handle routing and fan-out of coaxial links carrying radio frequency (RF) signals. Low-power coaxial splitters typically include planar internal features to route an input port to several output ports, and typically only have even numbers of split ports. Many of these also contain microstrip signal routing components (i.e., Wilkinson style) which increases insertion loss. High-power radial splitters/combiners can be found, but offer non-flexible power handling and are most often designed with an even number of ports. The costs associated with high-power radial devices are often high and lack flexibility in form and fit for certain high-density applications.

Thus, prime number splitters such as 5, 7, and 11 are difficult to find, and can have limitations on maximum power handling due to multipaction effects which can occur in waveguides or splitter devices. Multipaction, or the multipactor effect, is a resonance effect for electrons in vacuum that can exist in response to RF fields accelerating electrons in the voids in waveguides or splitter devices which then impact the surfaces in waveguides. Under certain conditions, these accelerated electrons can liberate additional electrons from the impacted surfaces, leading to a runaway effect of an exponentially increasing quantity of electrons being accelerated and freed. Multipaction results in various operational impacts, such as high losses, signal distortions, and ultimately equipment failures, particularly in space-deployed devices.

Overview

The examples herein present enhanced high-power coaxial RF splitters having an arbitrary quantity of radial ports, including odd or 'prime number' quantities of ports. A center conductor of an input coaxial connection port is coupled to a conductor element suspended within a housing internal volume by dielectric supports. The housing volume forms a vertical waveguide cavity along a longitudinal axis which leads to the output ports formed by square-axial (square-ax) branches formed in a plane perpendicular to the longitudinal axis of the conductor element. A bottom-penetrating thermal shunt is formed into the conductor element and provides for heat transfer from the conductor element to the housing.

In one example, an apparatus includes an input coaxial port having a center conductor coupled to a first longitudinal end of a generally cylindrical conductor member formed along a longitudinal axis within a housing forming a cavity about the conductor member. Output coaxial ports are included having center conductors coupled to generally square output branches arrayed at a second longitudinal end about the conductor member in a plane perpendicular to the longitudinal axis. A thermal shunt is included comprising a thermal connection between the housing and a recess formed into the conductor member along the longitudinal axis at the second longitudinal end.

In another example, a method includes forming an input coaxial port having a center conductor coupled to a first longitudinal end of a generally cylindrical conductor member formed along a longitudinal axis within a housing forming a cavity about the conductor member. The method also includes forming a plurality of output coaxial ports having center conductors coupled to generally square output branches arrayed at a second longitudinal end about the conductor member in a plane perpendicular to the longitudinal axis. The method also includes forming a thermal shunt comprising a thermal connection between the housing and a recess formed into the conductor member along the longitudinal axis at the second longitudinal end.

In yet another example, a coaxial splitter includes a conductive housing establishing a generally cylindrical cavity about a conductor member having a longitudinal axis, and establishing generally square cavities about a plurality of generally square branches arrayed from the conductor member in a plane perpendicular to the longitudinal axis. A first coaxial port having a center conductor is coupled to a first longitudinal end of the conductor member and a shield conductor coupled to the housing. Second coaxial ports having center conductors are coupled to the branches and shield conductors coupled to the housing. A thermal shunt comprising a thermal connection between the housing and a recess is formed into the conductor member along the longitudinal axis at a second longitudinal end. Dielectric supports are positioned between the conductor member and the housing and positioned between the branches and the housing.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The examples herein present enhanced high-power radio frequency (RF) coaxial splitters able to support an arbitrary quantity of ports. In these examples, a center conductor coaxial with a housing is fed from a first end of the housing and split symmetrically into any number of divided arms or branches, including prime numbers. Divided branches share equal phase and equal amounts of split power, and comprise square-axial members with respect to square housing branches. Specifically, an input coaxial connection port is coupled to a conductor element suspended within an enclosed volume by dielectric supports. The enclosed volume comprises a housing forming a vertical waveguide cavity along a longitudinal axis which leads to the output ports formed by square-axial (square-ax) branches formed perpendicular to the longitudinal axis of the conductor element. A bottom-penetrating thermal shunt is formed into the conductor element and provides for heat transfer from the conductor element to the housing. Advantageously, due to the shaping of the conductor element and the branches to avoid or reduce parallel surfaces, plating is not required to achieve multipaction goals and these elements can be formed from a single workpiece of conductive material. The examples herein provide for various desirable characteristics, such as symmetry for amplitude, phase and group delay balancing between output ports, and also enable a large bandwidth with very low insertion loss and exceptional return loss performance. The examples herein offer high power handling and high thermal dissipation from the inner to outer conductor by way of the integrated thermal shunt.

Figure 1:
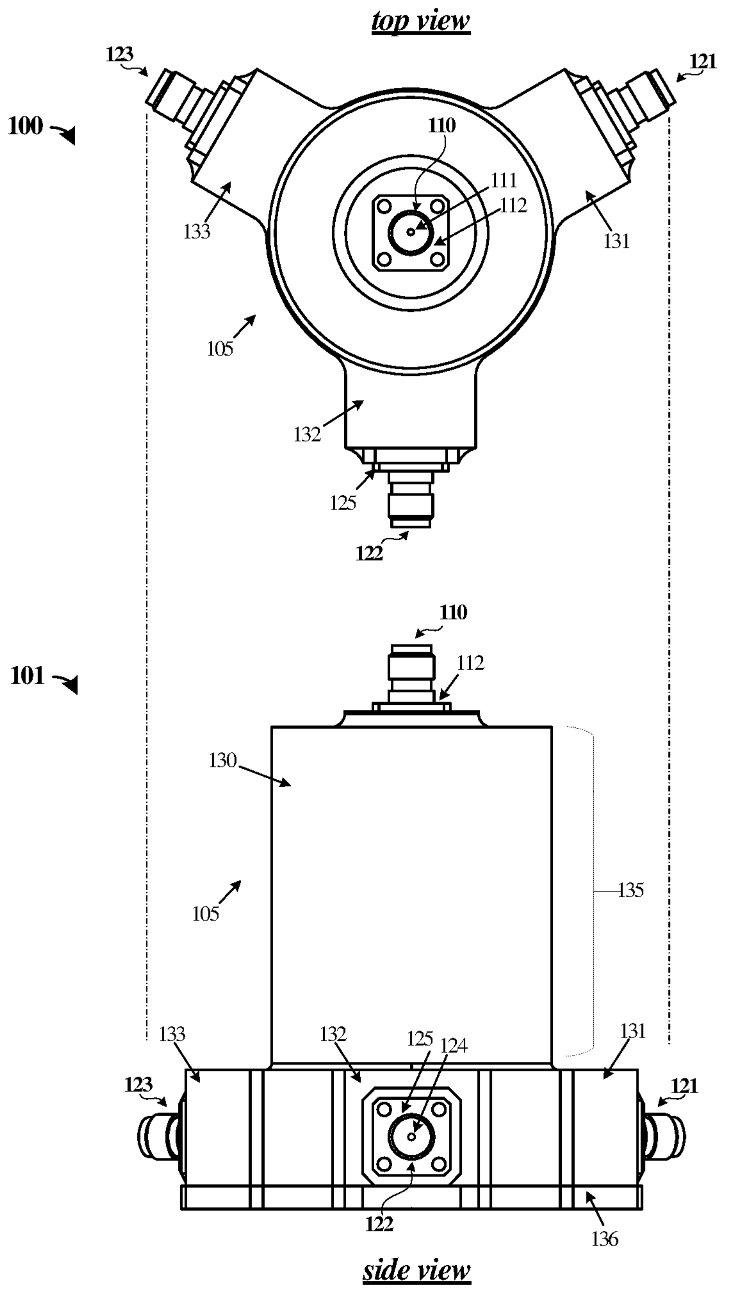
FIG. 1 illustrates various views of a three-way splitter in an implementation.

In a first example implementation, FIG. 1 is presented. FIG. 1 includes views 100 and 101. View 100 is a top view of coaxial splitter 105, and view 101 is a side view of coaxial splitter 105. Coaxial splitter 105 comprises housing 130 having generally cylindrical portion 135, a plurality of housing branches 131-133 extending perpendicular to the longitudinal axis of cylindrical portion 135, and end cap 136. Housing branches 131-133 include radial branch ports 121-123 fed by main axial port 110. Thus, coaxial splitter 105 includes a plurality of ports 110 and 121-123. Although port 110 can be referred to as an input or main port and ports 121-123 can be referred to as output or branch ports, other designations can be employed which may vary based on the direction of RF transmission or reception. Coaxial splitter 105 can act as an RF splitter when RF energy is introduced to port 110 and distributed among ports 121-123. In other configurations, coaxial splitter 105 might act as an RF combiner when more than one RF signal is introduced at ports 121-123 and combined to reach port 110.

Ports 110 and 121-123 comprise coaxial cable connectors capable of coupling to associated RF coaxial links (not shown). Ports 110 and 121-123 each comprise a connector housing electrically coupled to a shield conductor of a corresponding RF link, and a center conductor mating feature to electrically couple to a center conductor of the corresponding RF link. Port 110 includes coaxial center conductor feature 111 and connector housing 112. Port 122 includes center conductor feature 124 and connector housing 125. Ports 121 and 123 can include similar features, although not shown in FIG. 1 for clarity. Thus, ports 110 and 121-123 can be coupled to RF links and couple RF energy from coaxial splitter 105 to such RF links. Ports 110 and 121-123 might be separate connector workpieces, provided by vendors and not included in the manufacture of other portions of coaxial splitter 105. When separate workpieces, center conductor elements of ports 110 and 121-123 can be bonded to corresponding pin elements formed on internal features of coaxial splitter using conductive adhesive, solder, brazements, welds, or other techniques. Thus, ports 110 and 121-123 can be added or coupled to other separately manufactured components of coaxial splitter 105. Ports 110 and 121-123 might comprise various connector types, which may include threaded, press-fit, bayonet, friction-fit, or other connector types able to be disconnected and re-connected. Example connector types includes Threaded Neill-Concelman (TNC) and Bayonet Neill-Concelman (BNC), among others.

Figure 2:
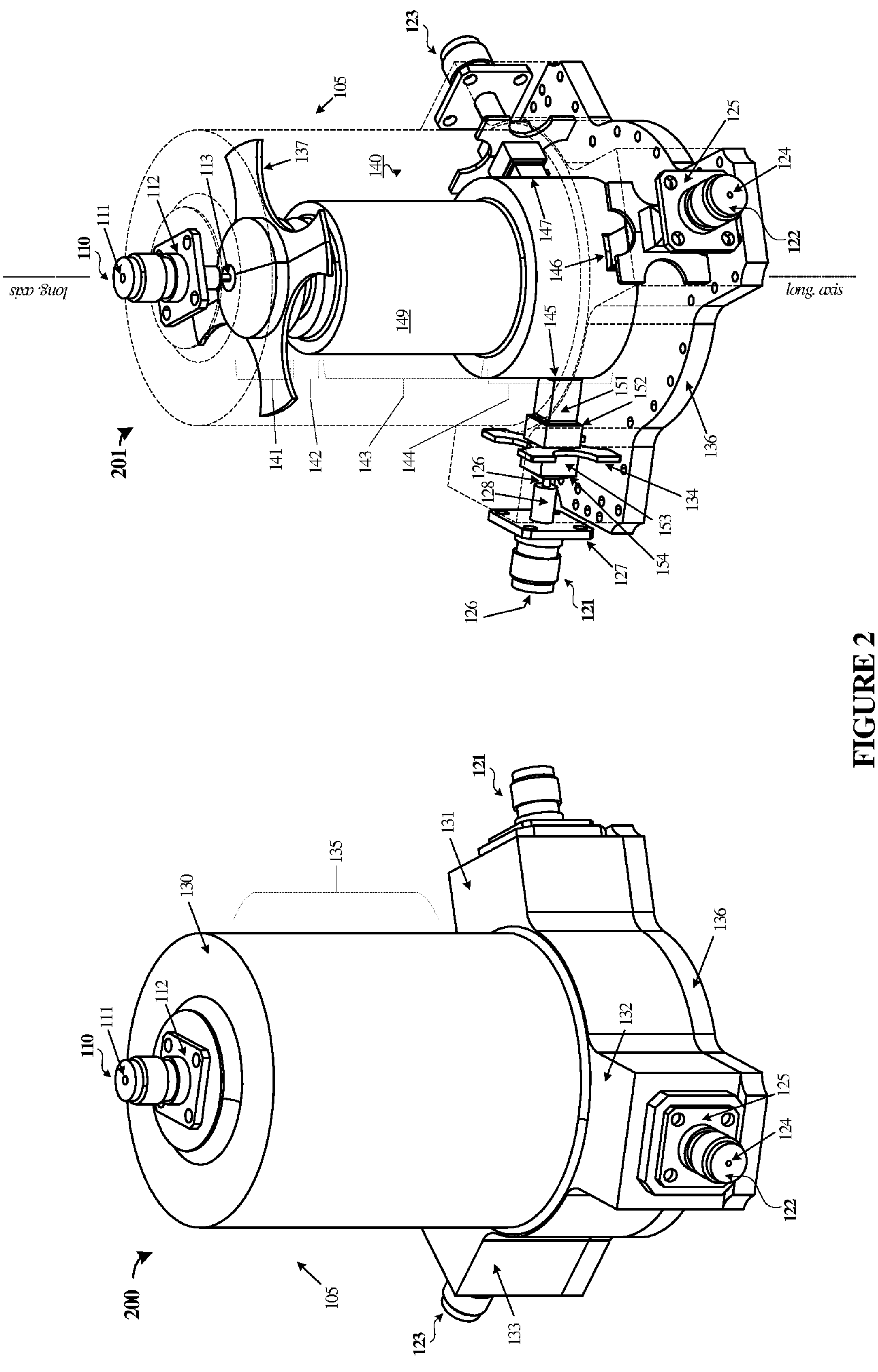
FIG. 2 illustrates various views of a three-way splitter in an implementation.

FIG. 2 includes additional views 200 and 201 of coaxial splitter 105. View 200 illustrates an external isometric view, while view 201 is illustrates a wireframe view highlighting internal features of coaxial splitter 105. Similar external features as seen in FIG. 1 are included in view 200. However, view 201 includes internal features which are not visible in view 200 or FIG. 1.

Turning now to view 201, port 110 is shown having center conductor feature 111 coupled via pin element 113 to a first longitudinal end of generally cylindrical conductor member 149 formed along a longitudinal axis and within housing 130 that forms waveguide cavity 140 about conductor member 149. Waveguide cavity 140 comprises a void or volume which can be air-filled or fluid/gas-filled when deployed in an atmosphere or evacuated when deployed into vacuum or space/orbital environments. Conductor member 149 includes several sections or portions having different geometric features, and is typically formed from a single piece of material. This material is generally conductive, such as aluminum, copper, or other suitable metal or metal alloy. Some examples may have a non-conductive material coated or plated with a conductive material. Dielectric support member 137 is also included and coupled to conductor member 149. Dielectric support member 137 comprises a dielectric material selected to not interfere with or conduct RF energy carried within waveguide cavity 140 while having sufficient structural rigidity to provide spacing and mechanical support between conductor member 149 and housing 130. Dielectric support member 137 is positioned between conductor member 149 and housing 130 to provide alignment between a first longitudinal end of conductor member and housing 130.

Conductor member 149 includes first section 141, second section 142, third section 143, and fourth section 144. First section 141 comprises an initial conical transition portion tapered away from pin element 113 and a top portion of housing 130. This conical taper can reduce multipaction effects by reducing or eliminating parallel surfaces between conductor member 149 and housing 130. Second section 142 transitions from first section 141 to third section 143 with a series of stepped transitions. The quantity and arrangement of the stepped transitions are selected based on the RF frequency or band desired to be carried by coaxial splitter 105. From here, third section 143 provides a cylindrical section that carries RF signals along the longitudinal length of waveguide cavity 140 before step-transitioning to a larger section, namely fourth section 144. Fourth section 144 includes several branches 145-147 that extend in a plane perpendicular to the longitudinal axis of conductor member 149. Fourth section 144 also includes internal features comprising a thermal shunt, which will be discussed in FIG. 3.

In operation, the transverse electromagnetic (TEM) mode of propagation is established about conductor member 149 and within waveguide cavity 140. RF energy associated with the TEM mode is transported along conductor member 149 and along each branch 145-147 to provide a generally symmetric output energy to each branch supplied from input port 110.

Turning now to branches 145-147, each branch comprises a generally square cross-section that extends out from fourth section 144 of conductor member 149. The generally square cross-section can be referred to as a square-axial or square-ax configuration, in contrast to the connectors/ports having a round or coaxial configuration. Each of branches 145-147 includes similar features, with a quantity of branches selected based on a desired quantity of ports. Although FIGS. 1-5 show one input port and three output ports (i.e., a 1:3 splitter configuration), other quantities of ports can be employed, such as 1:7 seen in FIG. 6. Thus, coaxial splitter

105 can be designed to have any quantity of ports, including quantities of even numbers, odd numbers, or prime numbers, based on the quantity of branches included.

An exemplary branch 145 has detailed features highlighted in view 201. Branches 146 and 147 include similar features but are omitted from this discussion for brevity and clarity. Branch 145 includes first square section 151 that transitions from fourth section 144 of conductor member 149 along a spur in the plane perpendicular to that of the longitudinal axis of conductor member 149. Section 151 steps up in diameter or cross-sectional area to section 153 via a tapered transition 152. Section 153 is coupled to dielectric support member 134. Dielectric support member 134 comprises a dielectric material selected to not interfere with or conduct RF energy carried by branch 145 while having sufficient structural rigidity to provide spacing and mechanical support between branch 145 and enclosure branch 131. Section 153 then transitions to center conductor feature 126 via tapered transition 154. This tapered transition 154 can reduce multipaction effects by reducing or eliminating parallel surfaces between branch 145 and enclosure branch 131. Port 121 then includes center conductor feature 126 surrounded by dielectric 127 that separates center conductor feature 126 from connector housing 127. Connector housing 127 is conductively coupled to enclosure branch 131. As mentioned above, each of branches 145-147 will have similar features feeding a corresponding port 121-123.

Figure 3:
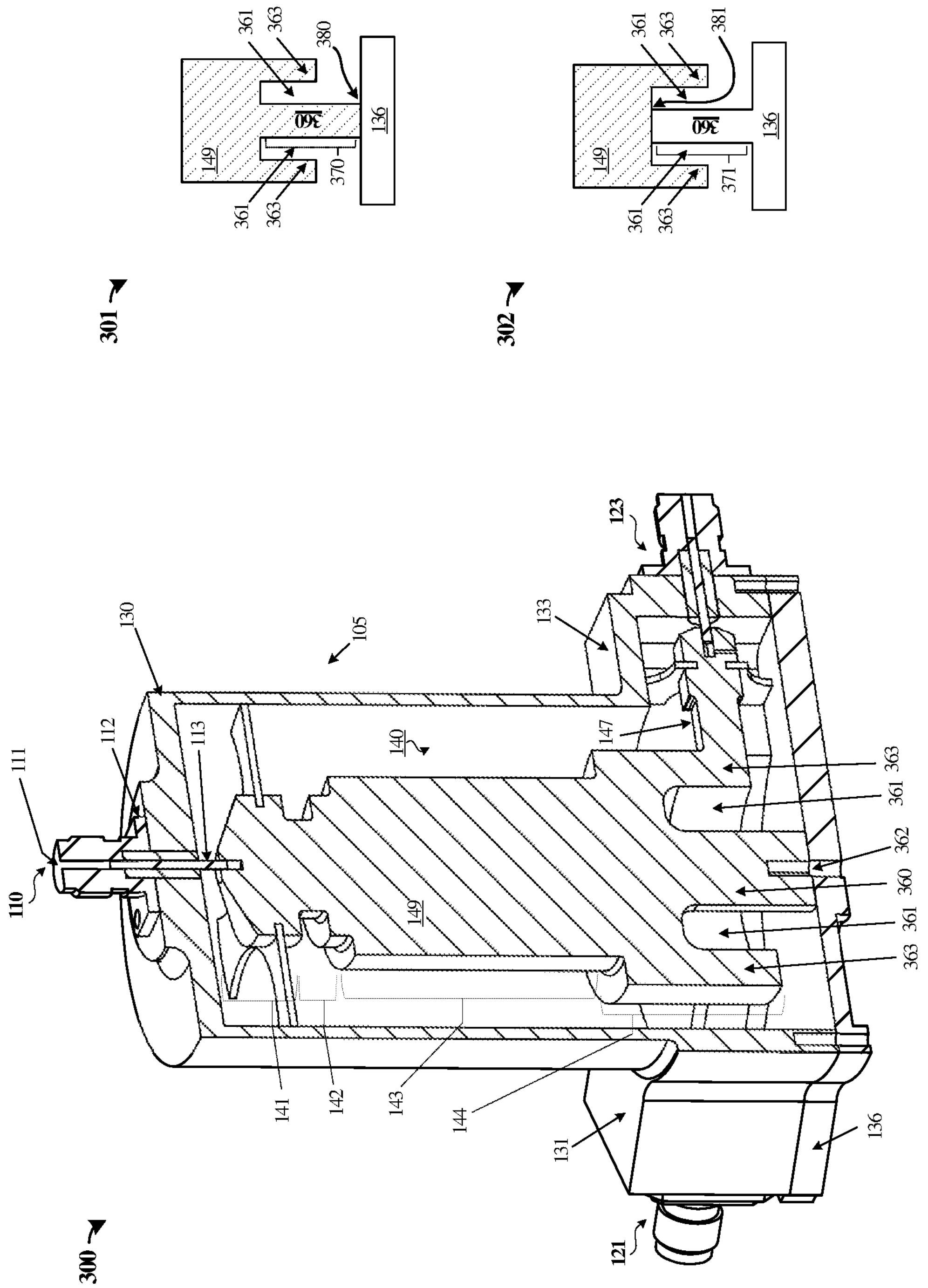
FIG. 3 illustrates a view of a three-way splitter in an implementation.

FIG. 3 includes cross-sectional view 300 that highlights internal features of coaxial splitter 105. Similar features are noted in FIGS. 1-2 above, and the discussion of FIG. 3 will focus on the elements now visible in view 300. FIG. 3 also includes cross-sectional views 301-302 which highlight different configurations or styles of a thermal shunt. The cross-sectional shape of conductor member 149 can be seen in view 300, highlighting the various sections 141-144. Section 144 includes several features related to thermal conduction by way of thermal shunt 360. Thermal shunt 360 conducts heat or thermal energy from conductor member 149 to housing 130 or end cap 136, which can then be conducted or radiated away from coaxial splitter 105.

Due to the high RF power levels carried by coaxial splitter 105, such as 800 Watts to over 1.3 kW at approximately 1-2 GHZ, resultant thermal energy is desired to be removed from coaxial splitter 105. Thermal shunt 360 comprises a junction-penetrating bottom shunt for thermal dissipations and thermal connection between housing 130 (end cap 136) and conductor member. The junction penetration is established by a toroidal recess formed into the bottom longitudinal end of conductor member 149 along the longitudinal axis, namely at a longitudinal end opposite to that of port 110. Thus, an 'inverted' thermal shunt configuration is employed, having the thermal shunt at least partially housed within conductor member 149. Depending on the implementation, thermal shunt 360 might comprise an extension of conductor member 149, an extension of end cap 136, or a separate workpiece disposed between conductor member 149 and end cap 136. The sizing of thermal shunt 360 can vary based on application, but may be ¼ wavelength in size in some examples. Moreover, thermal shunt 360 provides mechanical advantages by supporting conductor member 149 from one longitudinal end, which can lead to increased stress and vibration tolerance. The toroidal recess also decreases a mass of conductor element 149 by an amount corresponding to the omitted materials from conductor element 149.

View 301 and 302 highlight different configurations of thermal shunt 360, in a simplified or schematic representation. In a first shunt style in view 301, conductor member 149 comprises extension 370. Extension 370 is a fabricated as a portion of conductor member 149 formed form the same workpiece and material as conductor member 149. In this instance, thermal shunt 360 can contact end cap 136 at a relatively 'high' current region 380 within waveguide cavity 140. In a second shunt style in view 302, the external housing (e.g., housing 130 or end cap 136) is fabricated to include extension 371 that extends up towards conductor member 149, and thermal shunt 360 can comprise the same workpiece or material as end cap 136. In this second shunt style, thermal shunt 360 contacts conductive member 149 at or near a zero current region 381 in waveguide cavity 140 and in recess 361. Also, in this either shunt style, a fastener or other member can be inserted through end cap 136 to secure conductor member 149 to housing 130. This feature can be seen in view 300 as hole 362 configured to accommodate a suitable fastener. Thermal conductive paste or pads might be employed between conductor member 149 and end cap 136.

Conductive member 149 includes a thermal shunt recessing feature to establish a junction penetrating bottom shunt, where a portion of thermal shunt 360 is recessed into conductor member 149. The recessing feature is shown in FIG. 3 as forming a concentric void 361 about thermal shunt 360 and surrounded by concentric wall 363. Thermal shunt 360 extends from the root or base of recess/void 361 outward along the longitudinal axis. The length of thermal shunt 360 from the base of void 361 depends on the implementation, such as for the two shunt styles mentioned above. For example, when the first shunt style is employed, thermal shunt 360 might extend beyond the lower end of conductor member 149 to contact end cap 136, but in the second shunt style, thermal shunt 360 might extend to only be flush with conductor member 149, or be formed entirely by another separate member extending from end cap 136 and into void 361. The dimensions of the void (diameter and depth) as well as of thermal shunt 360 (diameter and length) can vary based on application, envelope constraints, desired performance characteristics, and other factors.

When passive intermodulation (PIM) concerns are more dominant, then mating between center conductor 149 and end cap 136 in a zero current region of waveguide cavity 140 is more desirable. PIM concerns become more dominant when both receive and transmit signals are employed over coaxial splitter 105. Thus, the second shunt style in view 302 mentioned above, namely thermal shunt 360 fabricated from housing 130 and contacting conductive member 149 at or near a zero current region in waveguide cavity 140, can be employed in such scenarios. Thermal shunt 360 then becomes part of the waveguide floor of waveguide cavity 140, with a material gap between end cap 136 and conductor member 149 pushed upward from end cap 136 towards void 361. Advantageously, waveguide cavity 140 remains unchanged in both types of thermal shunt, just the mating region for thermal shunt 360 is selected to be in a low/no current region or high current region of waveguide cavity 140.

Figure 4:
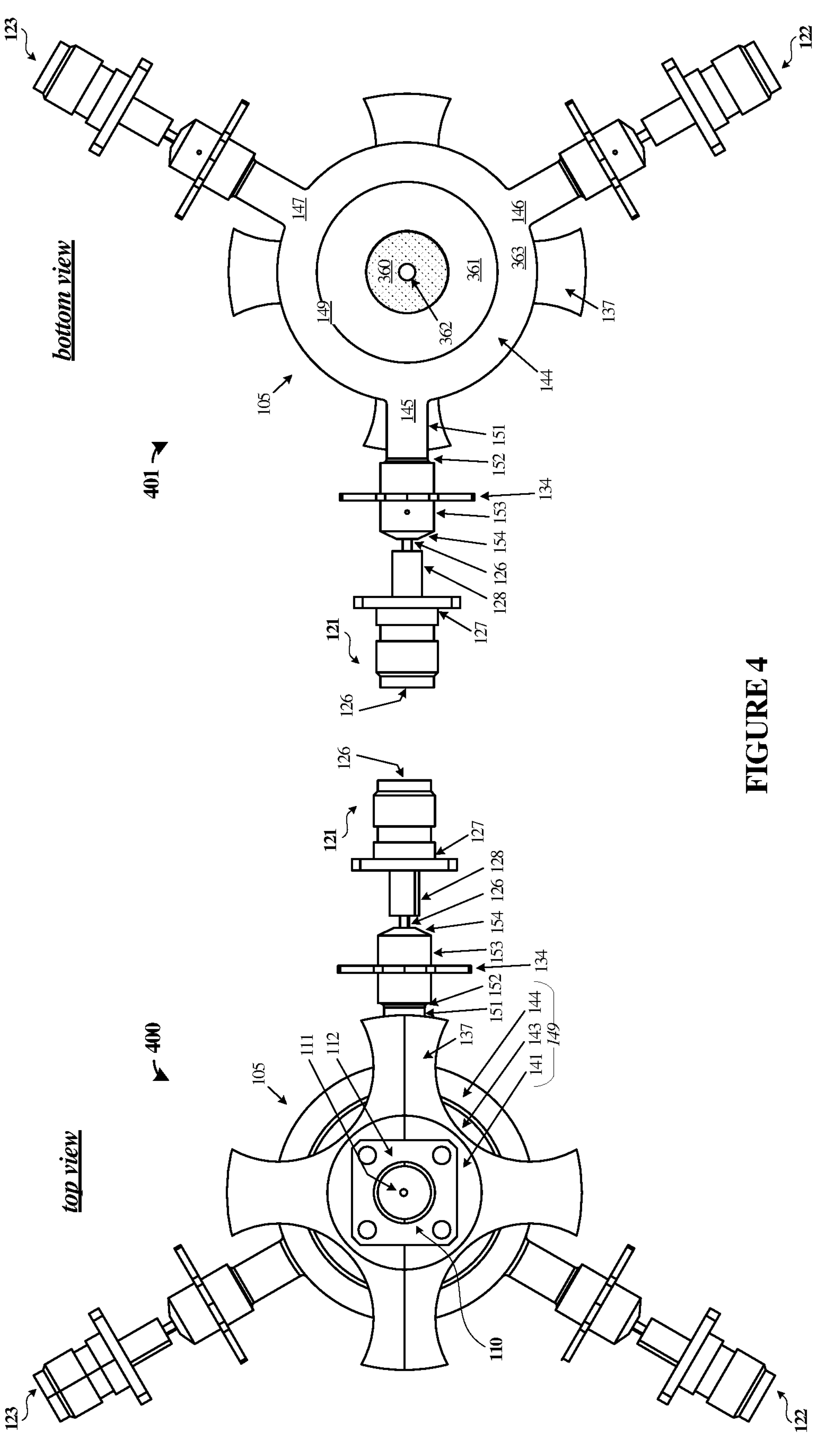
FIG. 4 illustrates various views of a three-way splitter in an implementation.

FIG. 4 includes additional views 400 and 401 of coaxial splitter 105. View 400 illustrates a top view with housing 130 omitted, while view 401 is illustrates bottom view with housing 130 omitted. Similar features as seen in FIG. 1-3 are included in views 400 and 401. Housing 130 is omitted in views 400 and 401 to highlight internal components of coaxial splitter 105.

Turning now to view 400, a top view of coaxial splitter 105 is shown. From this top view, port 110 can be seen in the center of the view having center conductor element 111 and connector housing 112. From here, conductor element 149 proceeds along a longitudinal axis (into the sheet), and having sections 141-144. Dielectric support 137 is also shown, which would normally make contact with the housing to support conductor element 149. Section 144 includes branches 145-147 arrayed perpendicular to the longitudinal axis. Branches 145-147 are equidistant from each other within a selected plane, and each include a square-ax portion leading to a connector portion for corresponding ports 121-123.

Turning now to view 401, a bottom view of coaxial splitter 105 is shown. From this bottom view, thermal shunt 360 can be seen in the center of the view having fastener hole 362 and concentric recess 361 proceeding along the longitudinal axis (into the sheet). As can be seen, thermal shunt 360 is formed within recess 361 which is then surrounded by concentric wall 363 of section 144 of conductor element 149. Views 400 and 401 also show profile views of the individual branches 145-147 to highlight the various sections/tapers of each branch.

Thus, FIGS. 1-4 illustrate an example coaxial splitter having symmetric RF energy distribution among ports. For example, when operating in an RF splitter configuration, a plurality of output coaxial ports each are configured to carry a roughly equal share of radio frequency energy supplied to an input coaxial port. When operating in an RF combiner configuration, a plurality of input coaxial ports each are configured to provide a roughly equal share of radio frequency energy to an output coaxial port.

To further illustrate the splitter mode of operation, coaxial splitter 105 has "input" coaxial port 110 having center conductor 111 coupled to a first longitudinal end of a generally cylindrical conductor member 149 formed along a longitudinal axis within enclosure or housing 130 forming a cavity about conductor member 149. Coaxial splitter 105 also includes a plurality of "output" coaxial ports 121-123 having center conductors coupled to generally square output branches 145-147 arrayed at a second longitudinal end about conductor member 149 in a plane perpendicular to the longitudinal axis. Shield conductors or connector housings of port 110 and ports 121-123 are conductively coupled to the housing. Thermal shunt 360 comprises a thermal connection between housing 130 and recess 361 formed into conductor member 149 along the longitudinal axis at the second longitudinal end. In some examples, thermal shunt 360 comprises a portion of conductor member 149 extending from within recess 361 at the second longitudinal end and contacting housing 130 below the second longitudinal end. In other examples, thermal shunt 360 comprises a portion of housing 130 extending from below conductor member 149 at the second longitudinal end and into recess 361 to contact conductor member 149. Furthermore, recess 361 forms concentric void about the thermal shunt and is surrounded by concentric wall 363.

To form the various components discussed herein, a single workpiece internal structure can be established. This single workpiece comprises conductor member 149 with branches 145-147. This single workpiece may also comprise thermal shunt 360 in certain cases, depending on the style or type of thermal shunt employed. Example manufacturing techniques can include machining this single workpiece from a piece of material, including aluminum or other suitable conductive materials. Alternatively, additive manufacturing, such as 3D printing, casting or metal injection molding, can be employed to form these single-workpiece structures. Thus, a coaxial central conductor member is formed along a longitudinal axis and a plurality of branches are formed as square-axial members branching perpendicular to that longitudinal axis. Various dielectric supports are included to align and isolate the conductive members from the housing. Example dielectric materials include polyetherimide, Ultem®, or other dielectric materials. In yet further examples, a split workpiece arrangement can be employed, having ends of conductor element 149 or branches 145-147 formed separately and joined together to form the internal structure. Although joints or breaks in materials can increase the risk of PIM, these split workpiece arrangements might be employed when concurrent transmit/receive is not carried by the splitter.

Advantageously, due to the shaping of the internal conductor members, the conductor members discussed herein can be formed from less expensive materials like aluminum and do not need to be plated with special conductive materials, such as silver, copper or gold, in order to achieve multipaction performance. Frequently, aluminum requires coating with other conductor materials to achieve multipaction performance goals. However, the examples herein can employ bare aluminum without special coatings to achieve these same multipaction goals. This configuration enables good symmetry with good amplitude and phase balance, while enabling a large bandwidth with large return loss bandwidth (>30 dB) and very low insertion loss. The bottom junction penetrating thermal shunt ensures very high-power handling by providing heat path between inner and outer conductors, and provides a robust mechanical design. Moreover, the input and output branches avoid parallel surfaces to a housing or enclosure along the axis of the branches, such as by employing widening conical features, to reduce multipaction effects.

Figure 5:
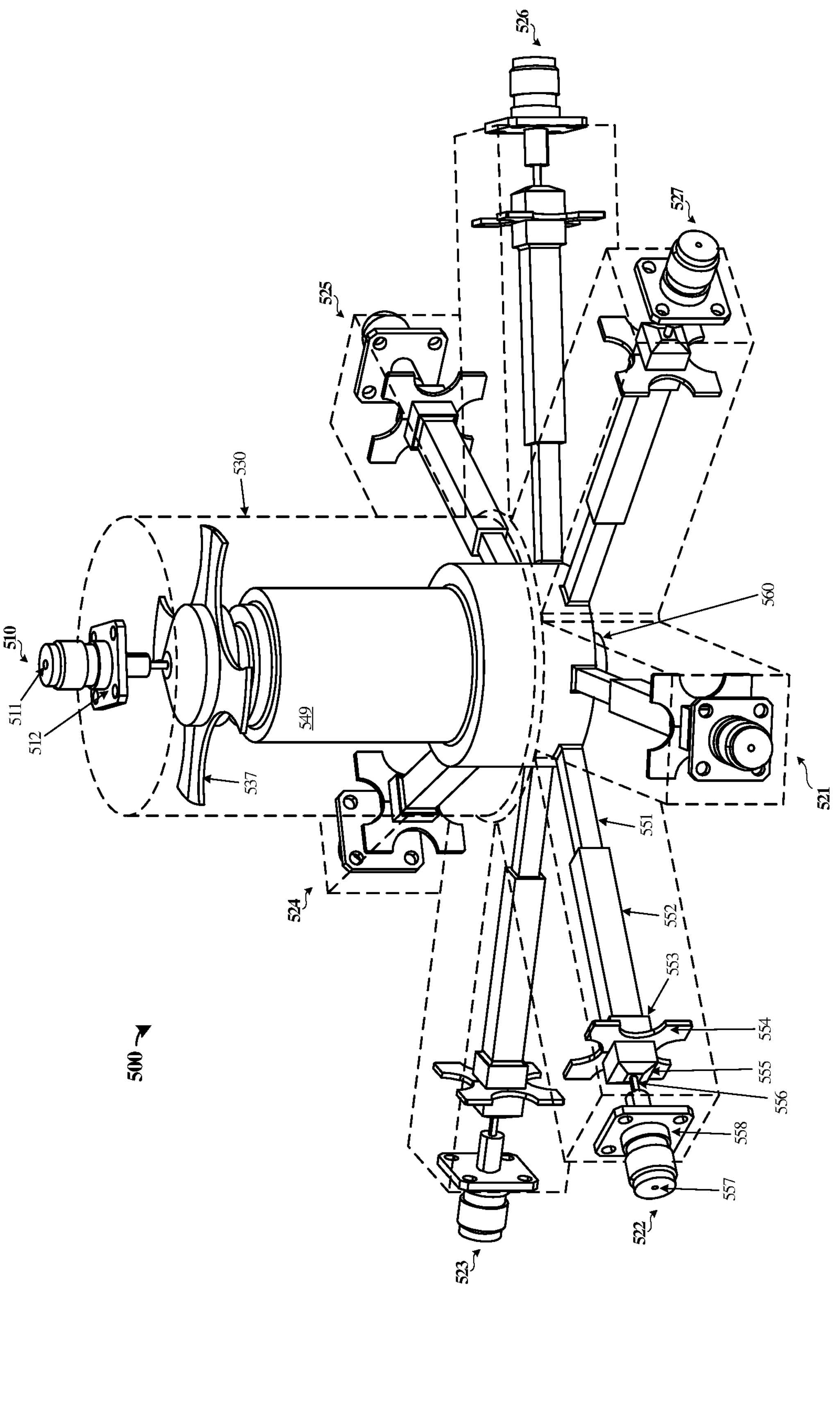
FIG. 5 illustrates an internal view of a seven-way splitter in an implementation.

FIG. 5 illustrates view 500 highlighting a seven-way (1:7) coaxial splitter, in which input port 510 can feed seven (7) output branches 521-527 (each port/branch having a corresponding connector). While similar individual elements are shown in FIG. 5 as seen in FIGS. 1-4, it should be understood that difference configurations are possible. In FIG. 5, input port 500 can include center conductor feature 511 coupled to conductor element 549, and connector housing 512 coupled to main housing 530 (hidden in this view). Dielectric support 537 aligns and supports conductor element 549 with respect to housing 530. Conductor element 549 comprises a coaxial member (with respect to main housing 530) formed along a longitudinal axis which branches into a plurality of output branches 521-527 comprising square-axial members (with respect to surrounding square housing branches). Dielectric supports are included for each branch (e.g., element 544). TNC-style input and output connectors are coupled to associated coaxial or square-axial members located internal to housing 130.

Taking branch 522 as an example, square-ax conductor member 551 branches perpendicular to conductor member 549, and transitions to a larger diameter or cross-sectional area square-ax conductor member 552, which further transitions to an even larger diameter or cross-sectional area square-ax conductor member 553, which is supported/aligned with respect to the branch enclosure/housing by dielectric support 554. Tapered transition 555 transitions from the square-ax configuration to pin element 556 which contacts the center conductor element 557 of the corresponding connector. Connector housing 558 is also conductively coupled to the corresponding branch of main housing 530. Also seen in FIG. 5 is thermal shunt 560 which is partially recessed into a toroidal void formed into conductor member 549. Thermal shunt 560 makes thermal contact with housing 530 below conductor member 549.

Figure 6:
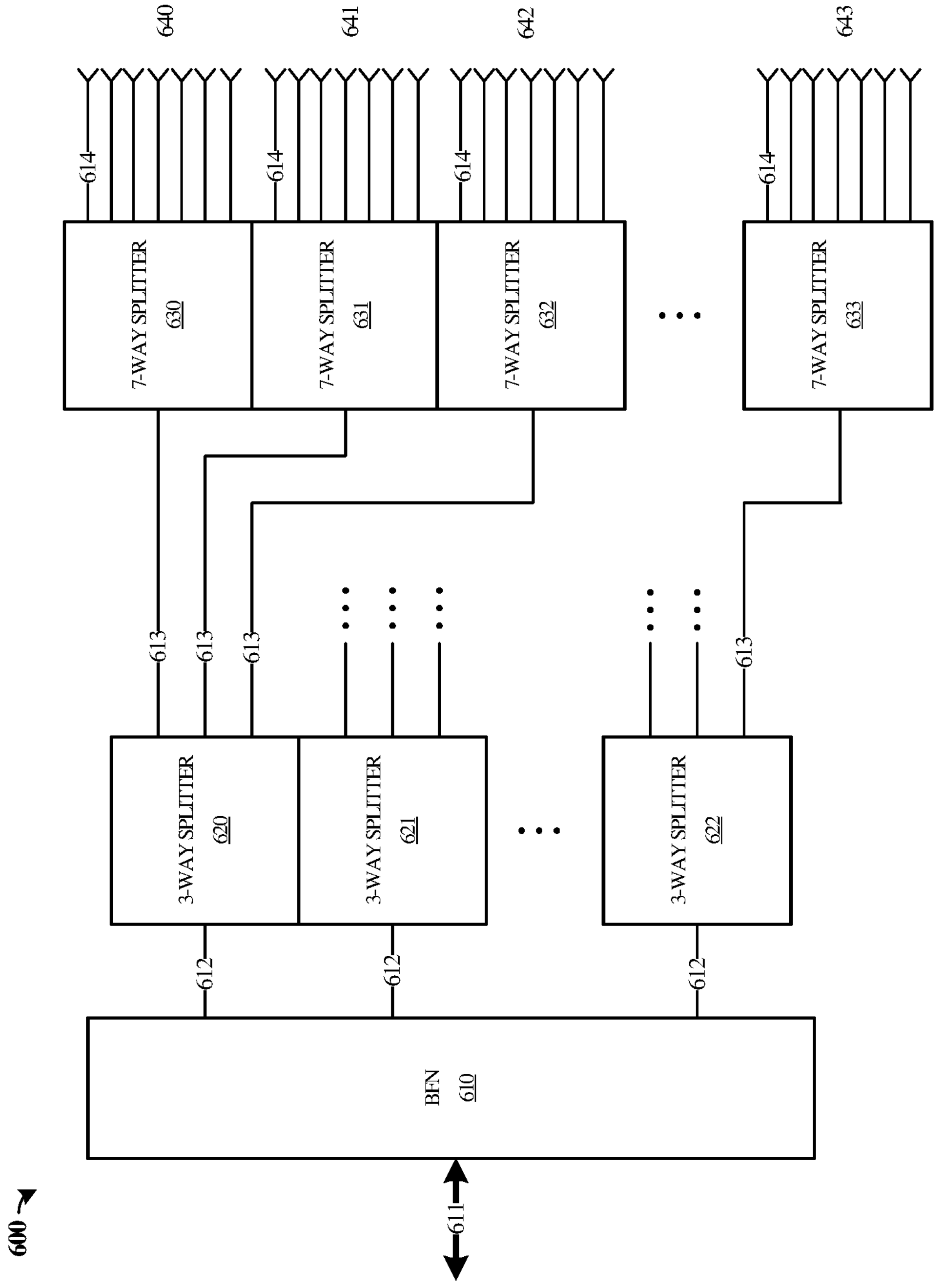
FIG. 6 illustrates schematic views of symmetric splitters in an implementation.

FIG. 6 illustrates an example schematic view showing system 600 that employs the various coaxial splitters discussed herein. System 600 includes both 3-way and 7-way splitters in a beamforming network to feed an antenna array. This antenna array might be employed in a transmit or receive configuration, including concurrent transmit/receive operations. The antenna array, formed from antenna elements 640-643, might form an electronically steerable array (ESA), among other configurations, which is deployed for satellite communications on a satellite or ground station.

Turning now to the elements of system 600, RF circuitry (not shown) is coupled over link 611 to beamforming network (BFN) 610. BFN 610 can form one or more RF beams based on desired transmit or receive characteristics for an antenna array. BEN 610 establishes several beam signals 612 that feed into 3-way splitters 620-622. These 3-way splitters might comprise elements shown above for FIGS. 1-4, although variations are possible. Specifically, each of 3-way splitters 620-622 divides an input signal (612) into three symmetric output signals 613. Each of the output signals 613 feeds a separate 7-way splitter 630-633. These 7-way splitters might comprise elements shown above for FIG. 5, although variations are possible. Specifically, each of 7-way splitters 630-633 divides an input signal (613) into three symmetric output signals 614. Output signals 614 are then routed to individual antenna elements 640-643 for transmission of associated RF signals.

The various links connecting BFN 610, 3-way splitters 620-622, 7-way splitters 630-633, and antennas 640-643 can comprise RF coaxial links. These RF coaxial links might include various intermediary links, amplifiers, routing elements, phase matchers, multiplexors, or other elements not shown for clarity. Moreover, each RF coaxial link can interface with BFN 610, 3-way splitters 620-622, 7-way splitters 630-633, and antennas 640-643 using corresponding connector elements, such as TNC-style connectors.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:

an input coaxial port having a center conductor coupled to a first longitudinal end of a generally cylindrical conductor member formed along a longitudinal axis within a housing forming a cavity about the conductor member;

a plurality of output coaxial ports having center conductors coupled to generally square output branches arrayed at a second longitudinal end about the conductor member in a plane perpendicular to the longitudinal axis; and a thermal shunt comprising a thermal connection between the housing and a recess formed into the conductor member along the longitudinal axis at the second longitudinal end.

2. The apparatus of claim 1, wherein the thermal shunt comprises a portion of the conductor member extending from within the recess at the second longitudinal end and contacting the housing below the second longitudinal end; and wherein the recess forms a concentric void about the thermal shunt.

3. The apparatus of claim 1, wherein the thermal shunt comprises a portion of the housing extending from below the conductor member at the second longitudinal end and into the recess to contact the conductor member.

4. The apparatus of claim 1, comprising:

shield conductors of the input coaxial port and the plurality of output coaxial ports coupled to the housing.

5. The apparatus of claim 1, wherein the plurality of output coaxial ports each are configured to carry a roughly equal share of radio frequency energy supplied to the input coaxial port.

6. The apparatus of claim 1, comprising:

a dielectric support positioned between the conductor member and the housing to provide alignment between the first longitudinal end of the conductor member and the housing; and dielectric supports positioned between the output branches and the housing.

7. The apparatus of claim 1, comprising:

an input conical portion of the conductor member coupled to the center conductor of the input coaxial port and sloped away from a portion of the housing adjoining the input coaxial port;

a series of stepwise increases in diameter along the longitudinal axis of the conductor member from an initial diameter following the input conical portion to a final diameter at the output branches; and output conical portions of the output branches coupled to the center conductors of the plurality of output coaxial ports and sloped away from portions of the housing adjoining the plurality of output coaxial ports.

8. The apparatus of claim 1, comprising:

the housing forming a generally cylindrical cavity about the conductor member and generally square cavities about the output branches.

9. The apparatus of claim 1, wherein a quantity of the plurality of output coaxial ports corresponds to a prime number of output coaxial ports greater than two.

10. A method, comprising:

forming an input coaxial port having a center conductor coupled to a first longitudinal end of a generally cylindrical conductor member formed along a longitudinal axis within a housing forming a cavity about the conductor member;

forming a plurality of output coaxial ports having center conductors coupled to generally square output branches arrayed at a second longitudinal end about the conductor member in a plane perpendicular to the longitudinal axis; and forming a thermal shunt comprising a thermal connection between the housing and a recess formed into the conductor member along the longitudinal axis at the second longitudinal end.

11. The method of claim 10, wherein the thermal shunt comprises a portion of the conductor member extending from within the recess at the second longitudinal end and contacting the housing below the second longitudinal end; and wherein the recess forms a concentric void about the thermal shunt.

12. The method of claim 10, wherein the thermal shunt comprises a portion of the housing extending from below the conductor member at the second longitudinal end and into the recess to contact the conductor member.

13. The method of claim 10, comprising:

forming shield conductors of the input coaxial port and the plurality of output coaxial ports coupled to the housing.

14. The method of claim 10, wherein the plurality of output coaxial ports each are configured to carry a roughly equal share of radio frequency energy supplied to the input coaxial port.

15. The method of claim 10, comprising:

forming a dielectric support positioned between the conductor member and the housing to provide alignment between the first longitudinal end of the conductor member and the housing; and forming dielectric supports positioned between the output branches and the housing.

16. The method of claim 10, comprising:

forming, in the conductor member, an input conical portion coupled to the center conductor of the input coaxial port and sloped away from a portion of the housing adjoining the input coaxial port;

forming, in the conductor member, a series of stepwise increases in diameter along the longitudinal axis from an initial diameter following the input conical portion to a final diameter at the output branches; and forming, in the output branches, output conical portions coupled to the center conductors of the plurality of output coaxial ports and sloped away from portions of the housing adjoining the plurality of output coaxial ports.

17. The method of claim 10, comprising:

forming the housing as having a generally cylindrical cavity about the conductor member and generally square cavities about the output branches.

18. The method of claim 10, wherein a quantity of the plurality of output coaxial ports corresponds to a prime number of output coaxial ports greater than two.

19. A coaxial splitter, comprising:

a conductive housing establishing a generally cylindrical cavity about a conductor member having a longitudinal axis, and establishing generally square cavities about a plurality of generally square branches arrayed from the conductor member in a plane perpendicular to the longitudinal axis;

a first coaxial port having a center conductor coupled to a first longitudinal end of the conductor member and a shield conductor coupled to the housing;

a plurality of second coaxial ports having center conductors coupled to the branches and shield conductors coupled to the housing;

a thermal shunt comprising a thermal connection between the housing and a recess formed into the conductor member along the longitudinal axis at a second longitudinal end; and a dielectric supports positioned between the conductor member and the housing and positioned between the branches and the housing.

20. The coaxial splitter of claim 19, comprising:

a conical portion of the conductor member coupled to the center conductor of the first coaxial port and sloped away from a portion of the housing adjoining the input first port;

a series of stepwise increases in diameter along the longitudinal axis of the conductor member from an initial diameter following the conical portion to a final diameter at the branches; and conical portions of the branches coupled to the center conductors of the plurality of second coaxial ports and sloped away from portions of the housing adjoining the plurality of second coaxial ports.

* * * * *